United States Patent
Vukovic et al.

(10) Patent No.: US 7,162,116 B1
(45) Date of Patent: Jan. 9, 2007

(54) DEPOPULATED SWITCHABLE MICRO ELECTRO-MECHANICAL SYSTEMS (MEMS) BASED MODULE FOR PHOTONIC FABRIC VERIFICATION AND PROTECTION

(75) Inventors: Mirjana S. Vukovic, Nepean (CA); Darwin Thom, Stittsville (CA); Dominic Goodwill, Kanata (CA); Alan Graves, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 765 days.

(21) Appl. No.: 10/463,580

(22) Filed: Jun. 18, 2003

(51) Int. Cl.
*G02B 6/35* (2006.01)
*G02B 6/28* (2006.01)
(52) U.S. Cl. .................... 385/17; 385/18; 385/24; 398/43
(58) Field of Classification Search ............ 385/17, 385/18
See application file for complete search history.

(56) References Cited

U.S. PATENT DOCUMENTS

| | | | | |
|---|---|---|---|---|
| 6,292,281 B1* | 9/2001 | Bala et al. | | 398/2 |
| 6,317,530 B1* | 11/2001 | Ford | | 385/17 |
| 6,490,382 B1* | 12/2002 | Hill | | 385/17 |
| 6,594,412 B1* | 7/2003 | Maeda et al. | | 385/17 |
| 6,901,179 B1* | 5/2005 | Oikawa | | 385/17 |
| 6,999,677 B1* | 2/2006 | Graves et al. | | 398/5 |
| 2005/0135734 A1* | 6/2005 | Akashi et al. | | 385/18 |

* cited by examiner

*Primary Examiner*—Michelle Connelly-Cushwa

(57) ABSTRACT

A depopulated MEMs array based protection switch is provided. The protection switch includes a depopulated protection array for rerouting optical signals using fewer switching elements than a fully populated array, and in some implementations an integrated test array for performing a self-test in service mode, and for testing failed optical components.

29 Claims, 9 Drawing Sheets

DEPOPULATED SWITCHABLE MICRO ELECTRO-MECHANICAL SYSTEMS (MEMS) BASED MODULE FOR PHOTONIC FABRIC VERIFICATION AND PROTECTION

CROSS-REFERENCE TO RELATED APPLICATIONS

The present application is related in subject matter to co-pending U.S. application Ser. No. 09/726,027, entitled "Protection Switching Arrangement for an Optical Switching System", filed on Nov. 30, 2000, assigned to the Assignee of the present invention and hereby incorporated by reference herein in its entirety.

FIELD OF THE INVENTION

The invention relates generally to systems for switching optical signals and more particularly to protection switches and protection switch arrangements for such systems.

BACKGROUND OF THE INVENTION

The facilitation of optical protection is an important aspect in any optical network. If protection is not provided, optical signals and the data they carry can be vulnerable to subsystem failure, component failure or otherwise any breakdown of the physical path traversed by the optical signals. Loss of data and degradation of service are just some of the problems associated with these types of failures. In order to provide some protection in the event of a failure, optical protection in the form of optical protection switching to reroute optical signals around a failed optical physical path may be employed.

As with any part of the optical network, optical protection is an important part of an optical switching system, and more so as DWDM (Dense Wavelength Division Multiplexing) systems utilize increasingly larger numbers of optical channels. Due to the multichannel nature of the components within the network, the failure of a single component has the potential to effect a large number of different channels at the same time.

A typical photonic-switched wavelength-grooming network node consists of a set of photonic line cards and a set of photonic switch fabric cards. Photonic switch fabric cards often comprise an array of 2D or 3D MEMS (Micro-Electro Mechanical Systems) optical switches that perform the optical switching of the node. MEMS based switching technology is often a compact solution with integrated digital control allowing switching of optical signals by the controllable switching of switching elements within the array. As is described hereinafter, an optical switch element may comprise MEMS arrays using micro-mirrors or may comprise micro-mirrors for switching elements or may have switching elements utilizing liquid drop technology, bubble technology, or any other of a number of optical signal redirecting technologies. Due to the possibility of switching element misalignment or failure within a MEMS, to ensure optical protection, it is necessary to frequently verify the integrity of the photonic switch fabric cards during network operation, detect any failure and, if necessary, switch to a redundant switch fabric card, the behavior of which has been verified.

To verify the integrity of a photonic switch fabric card, each photonic switch fabric card is put through its various connectivity states that can be accessed without disrupting in-service channels, and test light is injected into the card to facilitate testing of all of these states and verify function. The test light is measured before injection and compared with the test light after it emerges from the photonic switch fabric card to verify connectivity and possibly also to measure loss through the photonic switch fabric card. If required, while a photonic switch fabric card is being evaluated, any optical signals which would be interfered with due to testing, or due to possibility of failure, may be rerouted over a redundant switch fabric card. In general, the test light can come from a test transmitter, located typically on a photonic line card. Co-pending U.S. application Ser. No. 09/726,027 describes such a protection switching system, including a particular embodiment using a test light injection photonic switch built using a MEMS micro-mirror photonic switch chip that also provides protection of photonic switch fabric cards.

Generally, there are at least two distinct types of photonic line cards for use with a photonic node, a trunk type and a tributary type.

A photonic trunk line card has an ingress side, into which light of multiple wavelengths comes from the network fiber, passes through an optical amplifier, is demultiplexed and each wavelength sent to a respective photonic switch fabric card. Variable optical attenuators (VOAs), optical taps, optical monitors and optical supervisory channel (OSC) functions are added as required. Similar and complementary functions (typically including multiplexing) are present on the egress side of each photonic trunk line card, from which the light exits and proceeds into the network fiber. One of the functions of a trunk line card is to verify by scanning and measuring received optical power through all allowed connections that the photonic switch fabric card is in proper condition. As is proposed in U.S. application Ser. No. 09/726,027, test light injection photonic switches built using MEMS arrays are utilized in the trunk cards. This device also provides a redundant optical path to a redundant switch fabric card, so that in the event that an initially designated switch card of the system fails and needs to be protected, the protection module of the trunk card (via MEMS based switches) provides the redundant optical path to a redundant switch fabric card.

A photonic tributary line card is similar to a photonic trunk line card, except that it handles several network fibers, with each network fiber carrying only one wavelength, and hence no demultiplexing or multiplexing function is required. However, once again, each wavelength before it is sent to a respective photonic switch fabric card passes through the protection switch, and can be rerouted to a redundant photonic switch card if required.

SUMMARY OF THE INVENTION

This invention provides a depopulated MEMS array based protection switch. The protection switch includes a depopulated protection array for rerouting optical signals using fewer switching elements than a fully populated array, and in some implementations an integrated test array for performing a self-test in service mode, and for testing failed optical components.

According to a first broad aspect, the invention provides an optical protection switch comprising: a plurality of data inputs; for each data input a respective straight-through output, and a corresponding service optical path between the data input and its respective straight-through output; a plurality of protection outputs; for each protection output a respective protection optical path terminating at the protection output, each protection optical path intersecting each service optical path at a respective intersection location; and a protection array having a plurality of sites, each site located at an intersection location, the protection array adapted to operate in a protection mode and a service mode, the plurality of sites comprising: a plurality of populated sites, each populated site having a protection switching element for redirecting an input signal input at the respective data input towards the respective protection output when the protection array operates in protection mode, the protection switching element for allowing the input signal to traverse the populated site unaffected towards the respective straight-through output when the protection array operates in service mode, and a plurality of unpopulated sites, each unpopulated site for allowing an input signal input at the respective data input to pass through the unpopulated site unaffected towards the respective straight-through output.

In some embodiments of the invention each protection switching element is adapted to perform said redirecting by switching to an active state, and wherein the protection switching element is adapted to allow the input signal to traverse the populated site having the switching element, unaffected, by switching to an inactive state.

Some embodiments of the invention provide for a test input; and a test array adapted to, when the protection array operates in service mode, redirect a test signal input at the test input to traverse the plurality of sites for testing that each protection switching element of each populated site is in an inactive state.

In some embodiments of the invention the test array further comprises a switch test array, the switch test array comprising for each protection output a respective switch test site originating the respective protection optical path, each switch test site having a switch test switching element for redirecting the test signal along the respective protection optical path.

In some embodiments of the invention each switch test switching element performs said redirecting of the test signal when the protection array operates in the service mode by switching to an active state.

In some embodiments of the invention the test array further comprises an output test array, the output test array comprising: for each data input an output test site on the respective service optical path at a location between the protection array and the respective straight-through output, the output test site having an output test switching element adapted to, when the protection array operates in protection mode, redirect the test signal to the respective straight-through output, and adapted to, when the protection array operates in service mode, allow the input signal and the test signal to traverse the output test site unaffected.

In some embodiments of the invention each output test switching element performs said redirecting of the test signal when the protection array operates in protection mode by switching to an active state, and wherein the output test switching element performs said allowing the input signal and the test signal to traverse the output test site unaffected when the protection array operates in service mode by switching to an inactive state.

In some embodiments of the invention the switch test array further comprises a permanent switch site having a permanent switching element permanently in an active state, the permanent switching element adapted to, when the protection array operates in service mode, redirect the test signal input at the test input toward each switch test site.

In some embodiments of the invention each output test site is located on an optical path between the permanent switch site and the test input.

In some embodiments of the invention the test array, and the protection array are MEMs optical switch arrays, and wherein each protection switching element, the switch test switching element, the permanent switching element, and each output test switching element are MEMs micro-mirrors.

In some embodiments of the invention the test array and the protection array together comprise a switch array.

In some embodiments of the invention the test array and the protection array are portions of a single integrated switch array.

According to a second broad aspect the invention provides for an optical protection switch comprising: a plurality of data inputs; for each data input a respective straight-through output; a plurality of protection outputs; and a depopulated protection array adapted to operate in a protection mode for switching an input signal input at any one data input of the plurality of data inputs to one protection output of the plurality of protection outputs, the protection array adapted to operate in a service mode for allowing the input signal to be output at the respective straight-through output unaffected.

In some embodiments of the invention the protection array comprises switching elements for performing said switching of the input signal input.

In some embodiments of the invention the protection array operating in the service mode presents for each data input an unimpeded optical pathway between the data input and the respective straight-through output.

Some embodiments of the invention provide for a test input; and a test array adapted to, when the protection array operates in the service mode, redirect a test signal input at the test input for testing that each protection switching element is in an inactive state.

In some embodiments of the invention the test array further comprises a switch test array, the switch test array comprising a plurality of switch test sites, each switch test site having a switch test switching element adapted to perform said redirecting of the test signal.

In some embodiments of the invention the test array further comprises an output test array, the output test array comprising: for each data input, an output test site on the optical path between the data input and the respective straight-through output for, when the protection array operates in the protection mode, redirecting the test signal to the respective straight-through output, and adapted to, when the protection array operates in the service mode, allow an input signal input at the data input and the test signal to traverse the output test site unaffected.

According to a third broad aspect the invention provides for an optical protection switch comprising: a switching fabric comprising a plurality of sites arranged in intersecting rows and columns, the switching fabric adapted to operate in a protection mode and a service mode; a plurality of data inputs, each data input located at a first end of a respective row of the switching fabric; for each data input a respective straight-through output located at a second end of the respective row; and a plurality of protection outputs, each protection output located at a first end of the respective column of the switching fabric; wherein the plurality of sites of the switching fabric comprise: a plurality of populated sites, each populated site located at an intersection of a respective row of a data input and a respective column of a protection output, the populated site having a protection switching element for redirecting an input signal input at the data input towards the protection output when the switching fabric operates in protection mode, the protection switching element for allowing the input signal to traverse the populated site unaffected towards the respective straight-through output when the switching fabric operates in service mode, and a plurality of unpopulated sites, each unpopulated site located at an intersection of a respective row of a data input and a respective column of a protection output, the unpopulated site for allowing an input signal input at the data input to pass through the unpopulated site unaffected towards the respective straight-through output.

Some embodiments of the invention provide for a test input located at a first end of a test column of the switching fabric; wherein the plurality of sites of the switching fabric comprise a plurality of test sites, wherein the test sites are arranged to, when the switching fabric operates in service mode, redirect a test signal input at the test input to traverse the plurality of populated sites for testing that each protection switching element of each populated site is in an inactive state.

In some embodiments of the invention the plurality of test sites comprise a plurality of output test sites, each output test site being located on the test column on a respective row of a data input, the test column located nearest the second ends of the rows of the switching fabric, each output test site having an output test switching element adapted to, when the switching fabric operates in protection mode, redirect the test signal to the respective straight-through output, and adapted to, when the switching fabric operates in service mode, allow the input signal and the test signal to traverse the output test site unaffected.

In some embodiments of the invention each output test switching element performs said redirecting of the test signal when the switching fabric operates in protection mode by switching to an active state, and wherein the output test switching element performs said allowing the input signal and the test signal to traverse the output test site unaffected when the switching fabric operates in service mode by switching to an inactive state.

In some embodiments of the invention the plurality of test sites further comprise a plurality of switch test sites, each switch test site being located nearest the second end of the respective column of a protection output, each switch test site having a switch test switching element for redirecting the test signal along the respective column toward the protection output.

In some embodiments of the invention each switch test switching element performs said redirecting of the test signal when the switching fabric operates in the service mode by switching to an active state.

In some embodiments of the invention the plurality of switch test sites further comprise a permanent switch site having a permanent switching element permanently in an active state, the permanent switching element located on the test column at a row nearest the second end of the test column, the permanent switching element adapted to, when the switching fabric operates in service mode, redirect the test signal input at the test input toward each switch test site.

In some embodiments of the invention the plurality of test sites, and the plurality of protection sites are sites of MEMs optical switch arrays, and wherein each protection switching element, each switch test switching element, the permanent switching element, and each output test switching element is a MEMs micro-mirror.

In some embodiments of the invention the plurality of sites of the switching fabric together comprise a single integrated switch array.

Other aspects and features of the present invention will become apparent to those of ordinary skill in the art upon review of the following description of specific embodiments of the invention in conjunction with the accompanying figures.

BRIEF DESCRIPTION OF THE DRAWINGS

Preferred embodiments of the invention will now be described with reference to the accompanying diagrams, in which.

DETAILED DESCRIPTION OF THE PREFERRED EMBODIMENTS

Figure 1:
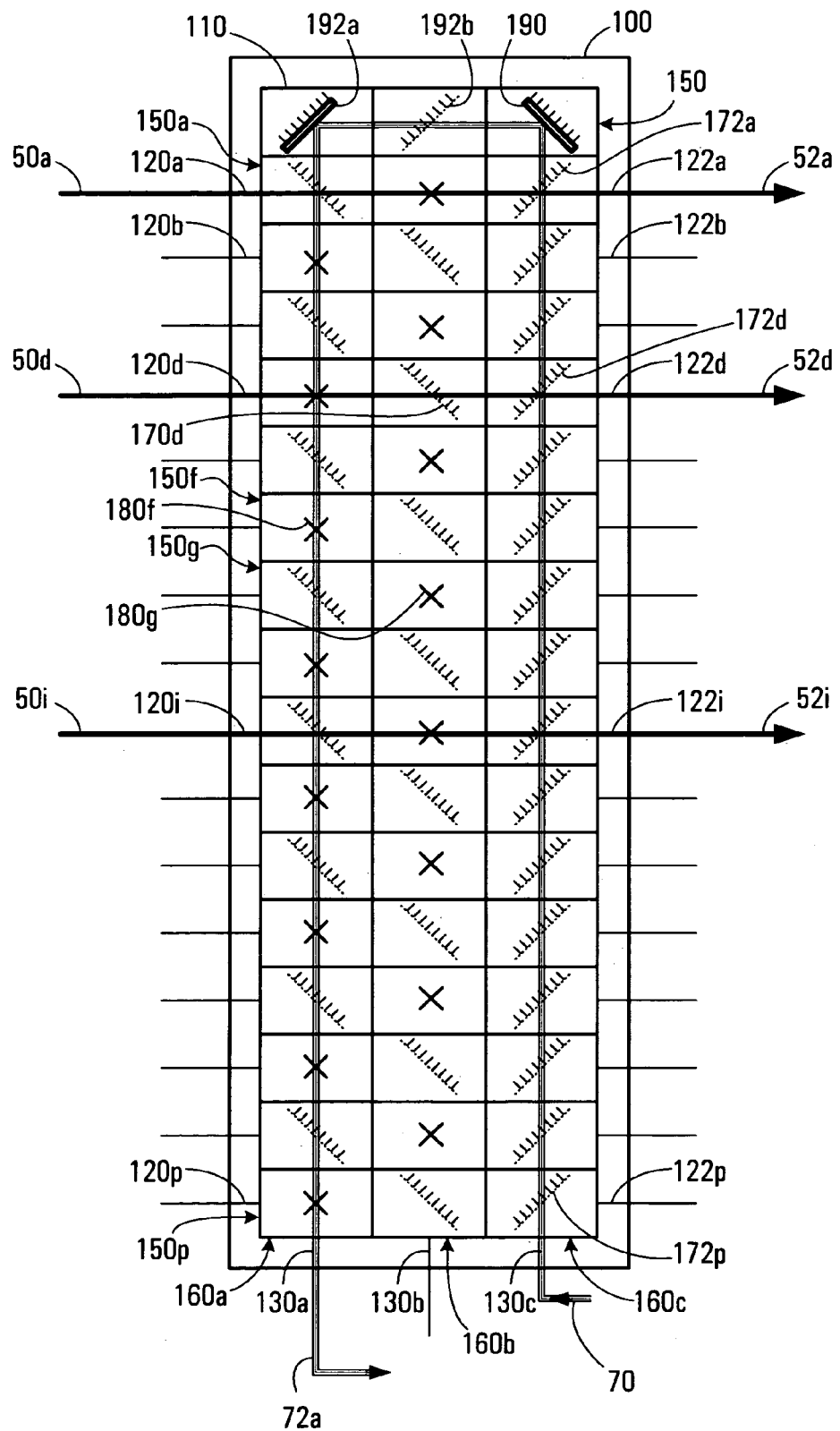
FIG. 1 is a schematic block diagram of a protection switch according to a first embodiment of the invention, the protection switch operating in service mode.

Each of the embodiments of the protection switch described herein is a depopulated 2D switchable MEMS array based protection switch. The protection switch is applied to perform photonic switch fabric verification and fast optical protection switching. Although the protection switch is described primarily in accordance with an ideal application in a trunk line card within a switching node, on the ingress and egress side of a switch card, the protection switch is applicable for protection of optical signals around any failed optical component or element. The ideal application space for the protection switch is with a series of 1:N in lambda plane protection switches in an all optical switch configuration.

The protection switch functions in two modes of operation, a service mode and a protection mode. While operating in service mode, the protection switch allows protected optical signals carrying in-service channels to traverse the protection switch unaffected. In service mode, the protection switch also monitors a protection path (described below) used in protection mode. The protection path is monitored using test light injected and extracted into the protection path. In service mode, the protection switch also performs a self-test to help ensure that optical signals carrying in-service channels are traversing the protection switch unaffected. While operating in protection mode, the protection switch operates to perform protection switching of optical signals carrying in-service channels over a protection path in the event that respective photonic switch card or other component fails. The protection path which may include a redundant switch fabric card or other redundant component corresponding to the failed component. In protection mode, the protection switch also monitors the failed in-service path by injecting test light into and extracting (if possible) test light from the failed in-service path which includes the failed photonic switch fabric card or other component. The test light may be advantageously used to test certain unused ports of a photonic switch fabric card, and for testing the photonic switch fabric card during commissioning either at initial installation or after replacement of a failed photonic switch fabric card.

To perform the self-test in service mode, the protection switch includes an integrated test array. To rerouting optical signals in protection mode, a depopulated protection array is used, having considerably fewer switching elements than a fully populated array. The inclusion of an integrated test array avoids insertion loss associated with external means for rerouting a test optical signal through the array, saves space by avoiding the need to provide an external switching mechanism, and avoids the need to include an extra port for rerouting test signals to and from the external mechanism. The implementation of a depopulated protection array considerably reduces the number of switching elements hence reducing the cost and complexity of manufacture of the protection switch, helping to reduce its size, and improving reliability by reducing the number of switching elements which could possibly fail.

There are numerous different ways in which a photonic protection module may be partitioned to handle optical protection for a number of different wavelengths. In the embodiment depicted in FIGS. 1,2,5, and 6 the protection switch is configured to protect 16 wavelengths, and provide two protection outputs over which a protected signal may be routed. In the embodiment depicted in FIGS. 3 and 4, the protection switch is configured to protect 32 wavelengths, and provide four protection outputs over which protected signals may be routed. Irrespective of the particular number of wavelengths to be protected, or the number of protection outputs over which a protected signal may be routed, any protection switch constructed according to the invention will comprise a depopulated MEMS array of switching elements for effecting two modes of operation, as described above.

To effect the two different modes of operation there are three different sub-arrays provided in this device. As described more fully below the protection switch has a protection array and a test array, the test array including an output test array and a switch test array.

Typically each optical signal input to the protection switch 100 is a single wavelength, which in the case of a trunk line card has been demultiplexed, and in the case of a tributary card has originated from a single wavelength optical fiber.

Referring to FIG. 1, a protection switch 100, according to a specific embodiment of the invention is described.

As will be more fully described below, the protection switch 100 is configured to protect two of sixteen optical signals.

The protection switch 100 has a switching array 110 which in the specific embodiment is a rectilinear grid of sites arranged into seventeen rows 150, and 150*a*–150*p* (not all labeled in the diagram) and three columns 160*a*–160*c*. Each site is either populated with a MEMS switching element or is depopulated, that is, having no switching element. In general, an optical signal may enter and leave each site in any of the four directions which are defined by the rectilinear grid. For the purposes of discussion only, these four directions will be referred to as up, down, left and right, as they correspond to the Figures as viewed. Each switching element within the switching array 110 is represented in the Figures by a diagonal segment. Each segment has a hashed region on one side, namely the side facing two rectilinear directions from the array site which are not coupled. The smooth side of the segment faces the two perpendicular directions from the array site which the switching element is arranged to couple. Coupling along two perpendicular directions is effected by redirecting optical signals incoming along one of these two directions by 90 degrees so that it is output along the other of these two directions. An active switching element is represented by an unbroken rectangular segment, whereas an inactive switching element is represented by a dashed segment. For example switching element 170*d* at row 150*d* and column 160*b* is configured for coupling to the left and downwards, but is depicted as being currently inactive. An active switching element 192*a* at row 150 and column 160*a* couples to the right, and downwards. As such an optical signal propagating from the right would be directed downwards, and an optical signal propagating from below would be directed to the right. A depopulated site, for example 180*f* at row 150*f*, column 160*a*, is represented by an x, and has no switching element present. Where no switching element is present, or when a switching element of a site is inactive, optical signals pass straight through the site unaffected. In a specific preferred embodiment, the switching elements are MEMS hinged micromirrors oriented at 45 degrees to a 2D array grid. The mirrors are depicted within each Figure, as having a reflective coating on the side facing the bottom of the page on which the Figure appears. Other alternate controllable optical switching arrays include thermo-capillary optical arrays which use the presence or absence of a drop of liquid at an intersection point of a grid to reflect or transmit optical signals, and bubble technology which works by a similar process. Given the capabilities of a particular type of optical switching element, its use in an array as a protection switch will be dictated by the requirements of the system, with respect to quality and strength of optical signals passing therethrough. The technology used in MEMS and their operation is generally known in the art, the specifics of which are beyond the scope of this document.

Within the array 110 are sub-arrays. The sites spanned by rows 150*a*–150*p* and columns 160*a*–160*b* form a protection array, whereas column 160*c* and row 150 together make up a test array. Within the test array, row 150 make up a switch test array, and sites within column 160*c* rows 150*a* to 150*p* make-up an output test array. The test array is fully populated, whereas the protection array is depopulated.

The switch 100 has 16 inputs 120*a*–120*p*, and corresponding straight-through outputs 122*a*–122*p*, each input and straight-through output being associated with each row of the switching array 110 except for row 150. Not shown are collimators associated with each input and output for directing optical signals along the rectilinear grid.

The switch 100 also has two protection outputs 130*a* and 130*b* associated with columns 160*a* and 160*b* respectively, and a test input 130*c* associated with column 160*c*.

Each row of the protection array, has a depopulated array site, and a populated array site. For example in row 150*g*, the protection array has a populated site at column 160*a*, and an unpopulated site at column 160*b*. Each of the populated sites in the protection array is for coupling an input (one of 120a–120p) to a protection output (one of 130a and 130b). Although the particular configuration of the protection switch 100 has the switching elements arranged diagonally in groups of two, in general, any particular arrangement will depend upon how the optical signals input to the protection switch are ordered, and the desired protection switching capabilities.

Every site in the test array is populated with a switching element. Each switching element in the output test array is arranged to couple test input 130c with a straight-through output associated with the row of the switching element. For example switching element 172d in row 150d is for coupling test input 130c to straight-through output 122d which corresponds to input 120d of row 150d. In the corner at the opposite end of column 160c from the test input 130c (at row 150 in column 160c) is a permanently active switching element 190 for coupling towards the left and downwards. Alternatively, switching element 190 could be a fixed corner micro-mirror or a prism. In the remaining columns of row 150, are switching elements 192a and 192b, for coupling towards the right (towards the permanently active switching element) and downwards along columns 160a and 160b respectively.

In terms of its function, a protection switch 100, according to a specific embodiment of the invention is input with optical signals along any subset of its inputs 120a–120p. As depicted in FIG. 1, in service mode, the protection switch presents optical paths with little or no optical impediment to optical signals input along inputs 120a–120p so that they are output through corresponding straight-through outputs 122a–122p unaffected. Although some collimators may be used at the inputs 120a–120p and at the straight-through outputs 122a–122p, losses to the optical signal are minimized by there being no active switching elements between each input and its respective output. In a specific preferred embodiment, in which the switching elements are MEMS hinged micro-mirrors, this may be achieved by having the mirrors retract completely away from the optical pathway that optical signals would traverse from the inputs to the corresponding outputs. In other embodiments a MEMS switching element in the inactive state would allow an optical signal to pass therethrough with as little loss to the signal as possible. As described above, the use of any particular switching element technology is determined by the requirements of the system, with respect to quality and strength of optical signals passing therethrough.

In FIG. 1, an example set of optical signals are depicted traversing the protection switch 100. In service mode, input signals 50a, 50d, and 50i enter inputs 120a, 120d, and 120i respectively, and traverse the switch unaffected to be output from corresponding straight-through outputs 122a, 122d, and 122i, as output signals 52a, 52d, and 52i respectively. As can be seen in FIG. 1, in service mode, all switching elements along the optical path traversed by all signals input over the inputs 120a–120p are inactive. This requires that all switching elements of the protection array and the output test array be inactive. For example switching elements 170d, and 172d in the optical path of input signal 50d over row 150d are both inactive.

In service mode, to ensure that all switching elements of the protection array and the output test array are inactive, the switch test array along with a test signal 70 are utilized. The test signal 70 originating from a test source (not shown) enters the test input 130c and traverses column 160c. The test signal 70 and all other test signals described in association with the remaining embodiments are of wavelengths sufficiently different from the in-service optical signals of the network to ensure that the data and signaling of the network are not affected by use of the test signal, even if some accidental contamination by the test signal occurs. If none of the switching elements in the output test array are active, the test signal 70 will impinge upon the permanently active switching element 190 in the switch test array, and be directed towards the remaining switching elements in the switch test array. At any one time either one or both of switching elements 192a and 192b is active, ensuring that the test signal 70 is directed downwards through the protection array at columns 160a and 160b. If none of the switching elements in the protection array are active, the test signal 70 directed downwards along column 160a or 160b emerges from a respective protection output 130a or 130b unaffected. By alternating the column 160a or 160b over which the test signal traverses, all of the switching elements of the protection array can be tested for inactivity. This can be achieved by alternatively switching the switching element 192a to and from an active state while simultaneously switching the switching element 192b to and from an inactive state. Alternatively, switching element 192a may be left in a permanently active state, while switching element 192b is switched between its active and inactive states, in which case switching element 192a could be a fixed corner micro-mirror or a prism. If any of the switching elements of the protection array in columns 160a or 160b are active, partially active, or otherwise imposing a non-free optical path within the site it occupies in the switching array 110, the test signal passing through that site will not emerge at the respective protection output 130a or 130b unaffected, and may not emerge at all. If any of the switching elements of the output test array in column 160c are active, partially active, or otherwise imposing a non-free optical path within the site it occupies in the switching array 110, the test signal 70 passing through that site will not emerge at either protection output 130a or 130b unaffected, and may not emerge at all. In any of these cases, this would represent a failure of the protection switch 100 in service mode. If, however, the test signal 70 appropriately emerges alternatively from protection outputs 130a and 130b unaffected, this is an indication that the protection switch is functioning properly in service mode.

In service mode, to ensure that the protection path including the redundant switch card or other component is operating properly, the test signal 72a emerging from the protection array through output 130a proceeds to test the remaining portion of the protection path. The test signal 72a proceeds to the redundant switch card or other component (not shown) which would be used if an in-service switch card or component which is arranged to receive optical signals from the straight-through outputs 122a–122p should fail. As described more fully in association with FIGS. 7 and 8, the test signal 72a is injected into the redundant switch card or other component to verify all possible protection paths through to a protection switch (not shown) on an egress side of the in-service switch card or other component.

Figure 2:
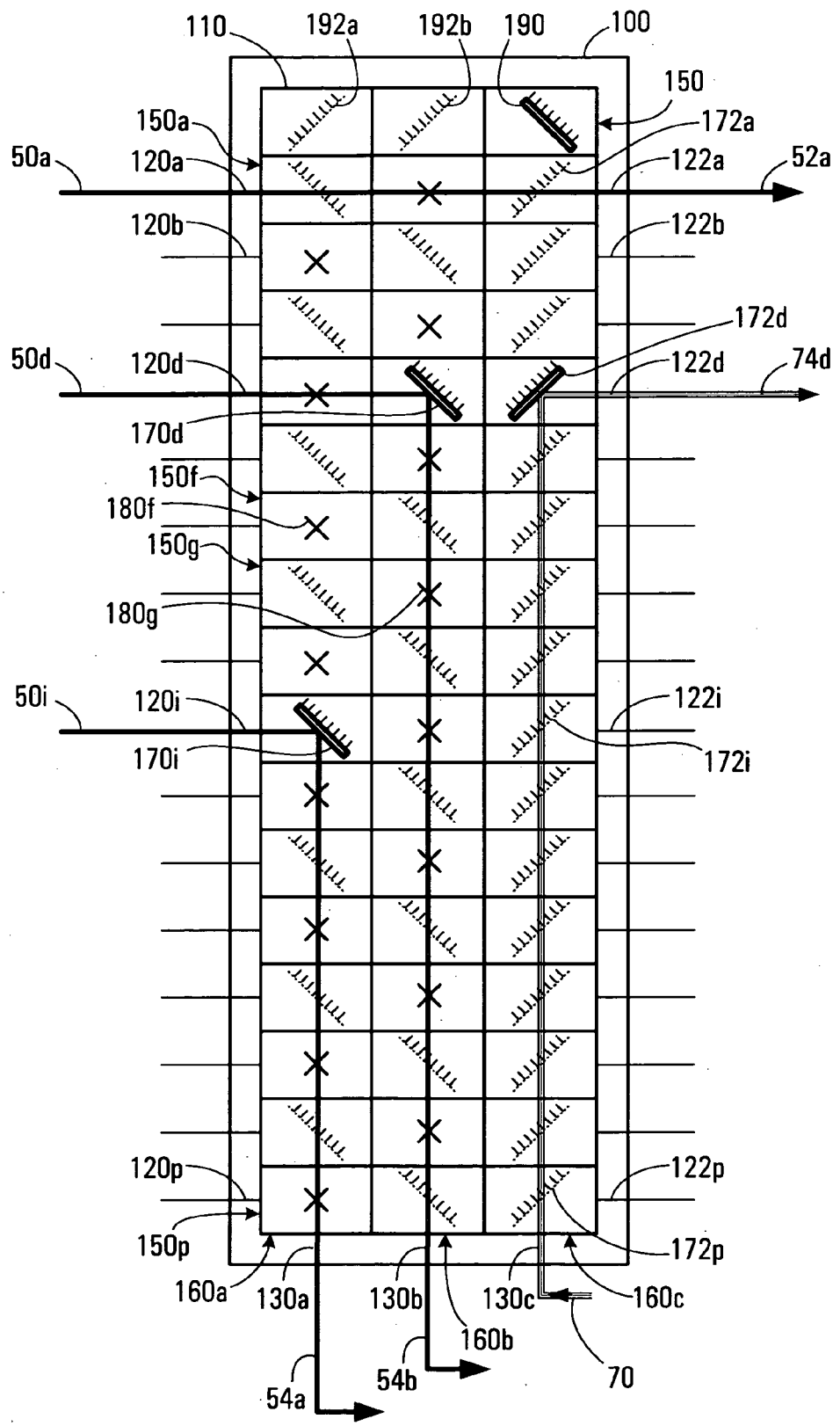
FIG. 2 is a schematic block diagram of the protection switch of FIG. 1 operating in protection mode.

In FIG. 2, the protection switch 100, according to the specific embodiment shown in FIG. 1, is depicted operating in protection mode.

In protection mode, the switch operates to divert an optical signal input at one of its inputs from being output over the corresponding straight-through output to being output through a protection output. This allows re-routing of the optical signal away from a failed or strangely behaving component or switch card to a spare component or switch card (as described in co-pending application Ser. No.

09/726,027). This is effected through use of switching elements in the protection array. For example, if optical input 50d input over input 120d must not be allowed to emerge over output 122d due to a failure farther down the optical path, a switching element 170d in row 150d at column 160b of the protection array is switched to its active state. Optical input signal 50d is thereby directed downwards along column 160b to emerge from protection output 130b as protection switched optical signal 54b. Similarly, switching element 170i is switched to its active state to redirect input signal 50i along column 160a to emerge from protection output 130a as protection switched optical signal 54a.

In protection mode, the components from which optical signals are redirected, may be tested with the test signal 70 by use of the output test array. For example, if the protection switch enters protection mode to redirect an optical signal which would have emerged from straight-through output 122d towards a component, a switching element 172d at row 150d could be switched to its active state to redirect the test signal 70 through the straight-through output 122d to emerge as a test signal 74d for testing the component. If more than one input signal is redirected to a protection output, the test signal can be used to test components one at a time by activating the output test array switching elements one at a time to redirect the test signal 70 through the appropriate straight-through output. For example in FIG. 2, both optical signals 50d and 50i have been redirected in protection mode. As described above, to test the component coupled to the straight-through output 122d, switching element 172d is activated to redirect the test signal 70 through straight-through output 122d. If testing of a component coupled to the straight-through output 122i is to be performed, switching element 172i would be activated to redirect the test signal 70 through straight-through output 122i.

As can be seen from the figures, the number of optical signal inputs which can be redirected is equal to the number of protection outputs provided, which in this case is two. Due to depopulation, each protection output is associated with a corresponding group of inputs it can be coupled to, the corresponding group of inputs being a subset of the total group of inputs. In the embodiment depicted in FIG. 2, these sets are mutually exclusive, although in general this need not be the case. Protection output 130a is associated with a first group of inputs 120a, 120c, 120e, 120g, 120i, 120k, 120m, and 120o, or every second input starting with input 120a. Protection output 130b is associated with a second group of inputs 120b, 120d, 120f, 120h, 120j, 1201, 120n, and 120p, or every second input starting with input 120b. Since only one input at a time may be coupled to each protection output, only one input of the first group of inputs can be coupled to protection output 130a at any one time, and only one input of the second group of inputs can be coupled to protection output 130b at any one time.

Figure 3:
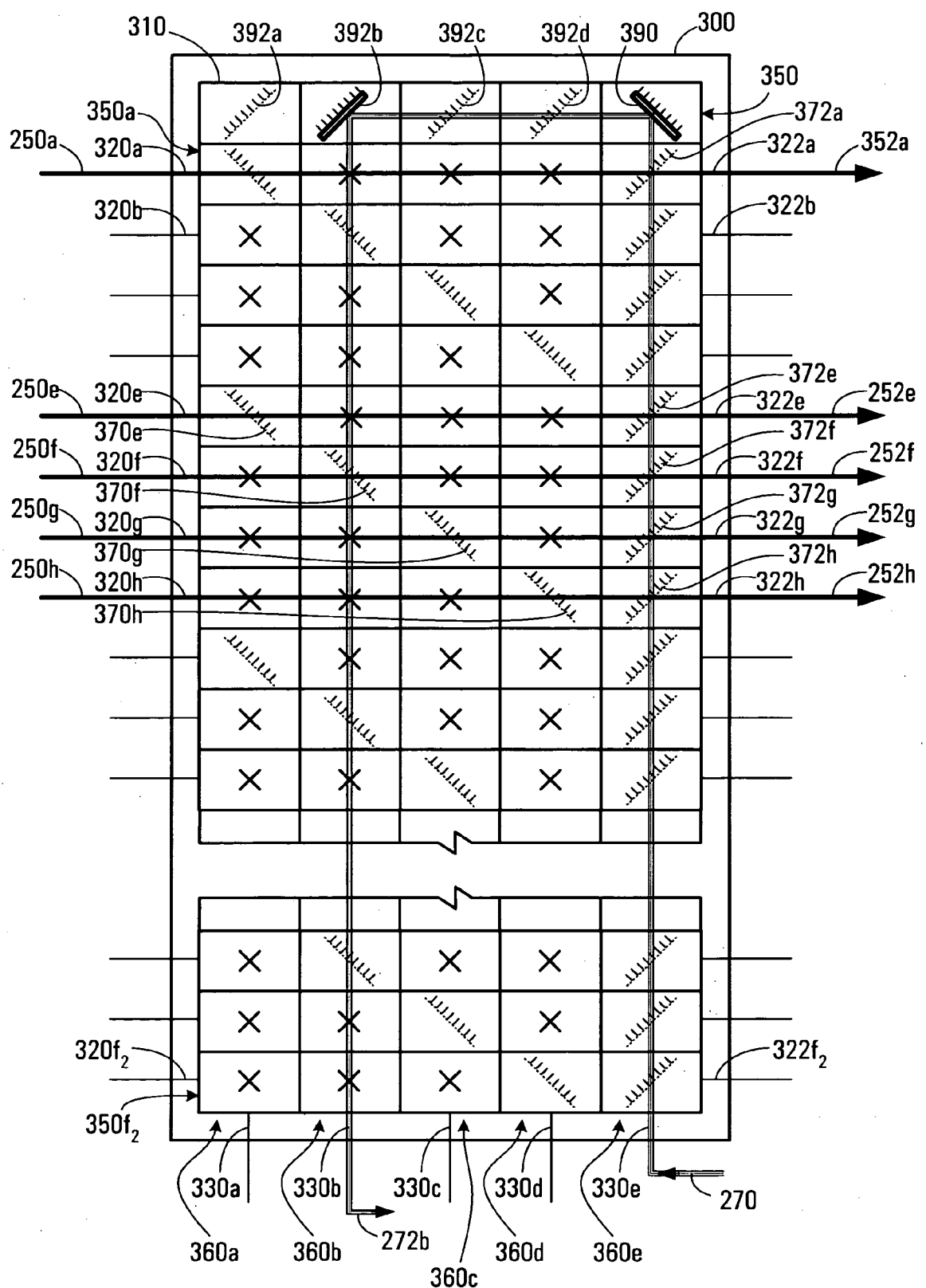
FIG. 3 is a schematic block diagram of a protection switch according to a second embodiment of the invention operating in service mode.

A second specific embodiment of a protection switch 300 is depicted in FIG. 3.

As is described more fully below, the protection switch 300 depicted in FIG. 3 is configured to protect 4 of 32 optical signals. Advantageously this may be used in a DWDM system to protect 32 wavelengths, and if the individual wavelengths are so arranged, protection may be provided for four banded in-service channels.

The protection switch 300 has a switching array 310 which in this specific embodiment is a rectilinear grid of sites arranged into thirty-three rows 350, 350a–350$f_2$ (not all labeled in the diagram) and five columns 360a–360e. As with the embodiment described in association with FIGS. 1 and 2, each site is either populated with a MEMS switching element or is depopulated. The test array is fully populated whereas the protection array is depopulated.

In this specific embodiment, the sites spanned by rows 350a–350$f_2$ and columns 360a–360d form the protection array, whereas column 360e and row 350 together make-up the test array. Within the test array, row 350 makes up a switch test array, and sites within column 360e rows 350a to 350$f_2$ make-up the output test array.

The switch 300 has thirty-two inputs 320a–320$f_2$, and corresponding straight-through outputs 322a–322$f_2$, each input and straight-through output being associated with each row of the switching array 310 except for row 350. The switch 300 also has four protection outputs 330a–330d associated with columns 360a–360d respectively, and a test input 330e associated with column 360e.

In this specific embodiment, each row of the protection array, has three depopulated array sites, and a populated array site. For example in row 350g, the protection array has a populated site at column 360c, and unpopulated sites at columns 360a, 360b, and 360d. Each of the populated sites in the protection array is for coupling an input (one of 320a–320$f_2$) to a protection output (one of 330a through 330d) Although the particular configuration of the protection switch 300 has the switching elements arranged diagonally in groups of four, in general, any particular arrangement will depend upon how the optical signals input to the protection switch are ordered, and the desired protection switching capabilities.

Every site in the test array is populated with a switching element. Each switching element in the output test array is arranged to couple test input 330e with a straight-through output associated with the row of the switching element. For example switching element 372f in row 350f is for coupling test input 330e to straight-through output 322f which corresponds to input 320f of row 350f. In the corner at the opposite end of column 360e from the test input 330e (at row 350 in column 360e) is a permanently active switching element 390 for coupling towards the left and downwards. Alternatively, switching element 390 could be a fixed corner micro-mirror or a prism. In the remaining array sites of row 350, are switching elements 392a–392d, for coupling towards the right (towards the permanently active switching element 390) and downwards along columns 360a through 360d respectively.

In terms of its function, a protection switch 300, according to a specific embodiment of the invention is input with optical signals along any subset of its inputs 320a–320$f_2$. As shown in FIG. 3, in service mode, the protection switch 300 presents optical paths with little or no optical impediment to optical signals input along inputs 320a–320$f_2$ so that they are output through corresponding straight-through outputs 322a–322$f_2$ unaffected. In FIG. 3, an example set of optical signals are shown traversing the protection switch 300. In service mode, input signals 250a, 250e–250h, enter inputs 320a, and 320e–320h respectively, and traverse the switch unaffected to be output from corresponding straight-through outputs 322e–322h, as output signals 252a–252h respectively. As was the case with the embodiment depicted in association with FIGS. 1 and 2, in service mode, all switching elements along the optical path traversed by all signals input over the inputs 320a–320$f_2$ are inactive. This requires that all switching elements of the protection array and the output test array be inactive. For example switching elements 370e and 372e in the optical path of input signal 250e over row 250e are both inactive.

As was the case with the embodiment depicted in FIGS. 1 and 2, in service mode, to ensure that all switching elements of the protection array and the output test array are inactive, the switch test array along with a test signal 270 are utilized. The test signal 270 enters the test input 330e and traverses column 360e. If none of the switching elements in the output test array are active, the test signal 270 will impinge upon the permanently active switching element 390 in the switch test array, and be directed towards the remaining switching elements in the switch test array. At any one time at least one of switching elements 392a through 392d is active, ensuring that the test signal 270 is directed downwards through the protection array at one of columns 360a through 360d. If none of the switching elements in the protection array are active, the test signal 270 directed downwards along any one of columns 360a–360d emerges from respective protection output 330a–330d unaffected. By alternating the column 360a, 360b, 360c or 360d over which the test signal traverses, all of the switching elements of the protection array can be tested for inactivity. This can be achieved by switching in turn, each one of the switching elements 392a–392d to an active state while simultaneously switching the remaining switching elements of 392a–392d to an inactive state. Alternatively, switching element 392a may be left in a permanently active state, while the remaining switching elements 392b–392d are cycled through states in which only one of them is switched to an active state, and a state in which all of them are switched to an inactive state. In such a situation switching element 392a could be a fixed corner micro-mirror or a prism. If any of the switching elements of the protection array in columns 360a –360d are active, partially active, or otherwise imposing a non-free optical path within the site it occupies in the switching array 310, the test signal 270 passing through that site will not emerge at the respective protection output 330a–330d unaffected, and may not emerge at all. If any of the switching elements of the output test array in column 360e are active, partially active, or otherwise imposing a non-free optical path within the site it occupies in the switching array 310, the test signal 270 passing through that site will not emerge at any of the protection outputs 330a–330d unaffected, and may not emerge at all. In any of these cases, this would represent a failure of the protection switch 300 in service mode. If, however, the test signal 270 appropriately emerges alternatively from protection outputs 330a–330d unaffected, this is an indication that the protection switch is functioning properly in service mode.

In service mode, to ensure that the protection path including the redundant switch card or other component is operating properly, the test signal 272b emerging from the protection array through output 330b proceeds to test the remaining portion of the protection path. The test signal 272b proceeds to the redundant switch card or other component (not shown) which would be used if an in-service switch card or other component which is arranged to receive optical signals from the straight-through outputs should fail. The test signal 272b is injected into the redundant switch card or other component to verify all possible protection paths through to a protection switch (not shown) on an egress side of the in-service switch card or other component.

Figure 4:
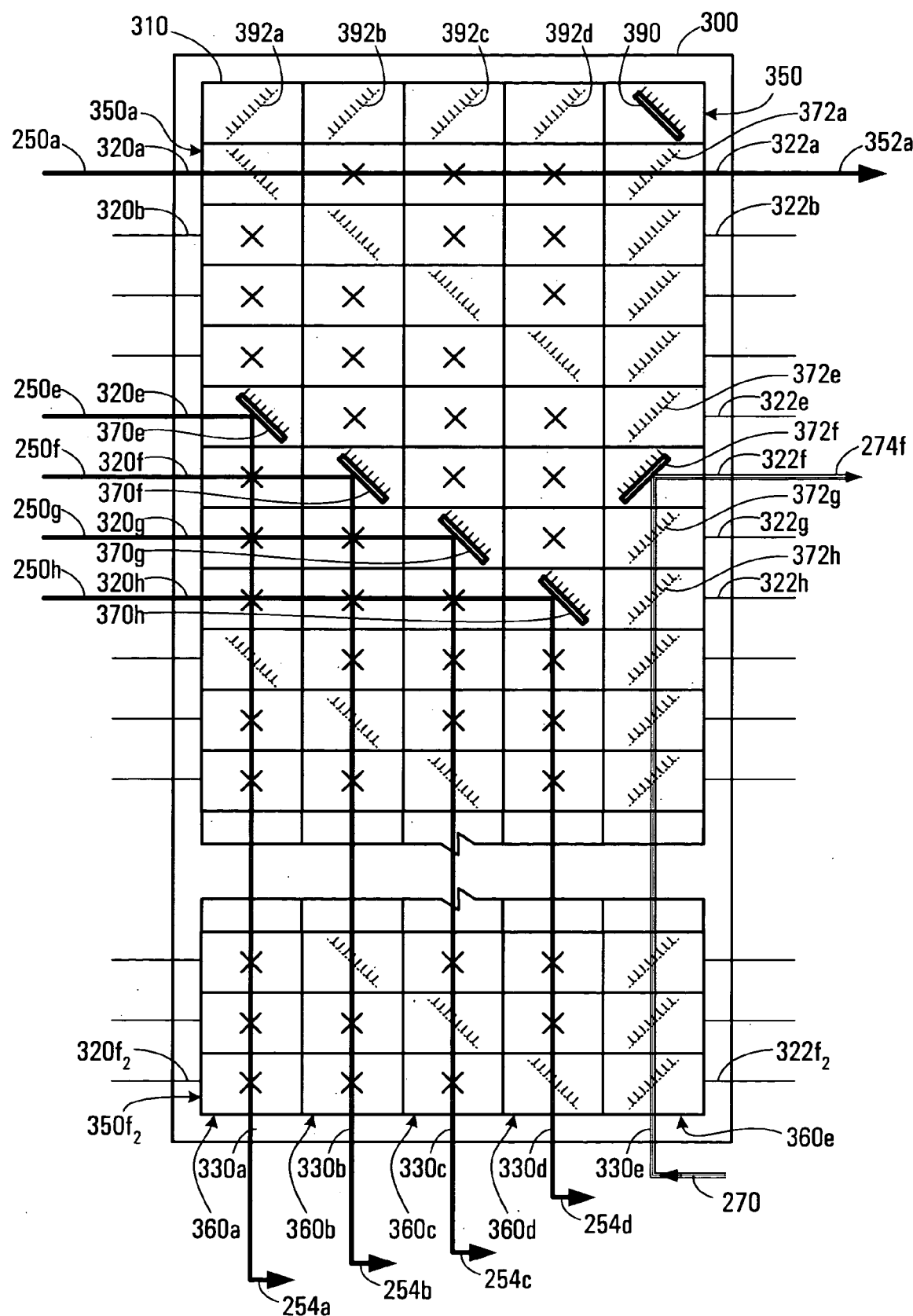
FIG. 4 is a schematic block diagram of the protection switch of FIG. 3 operating in protection mode.

In FIG. 4, the protection switch 300 of FIG. 3, is depicted operating in protection mode.

As with the embodiment described in association with FIGS. 1 and 2, in protection mode, the protection switch 300 operates to divert an optical signal input at one of its inputs from being output over the corresponding straight-through output to being output through a protection output. As depicted in FIG. 4, for example, optical inputs 250e–250h input over inputs 320e–320h are not to be allowed to emerge over respective straight-through outputs 322e–322h. Switching elements 370e–370h of the protection array located in respective rows 250e–250h and at respective columns 360a –360d are switched to their active states. Optical input signals 250e–250h are thereby redirected downwards along respective columns 360a–360d to emerge from respective protection outputs 330a–330d as protection switched optical signals 254a–254d. In a specific arrangement for use in a DWDM system, every group of four rows beginning with row 350a are input with a group of four banded in-service channels. As such, in FIG. 4, four banded in-service channels are being rerouted simultaneously.

As with the embodiment described in association with FIGS. 1 and 2, in protection mode, the components from which optical signals are redirected, may be tested with a test signal 270 by use of the output test array. For example, if the protection switch enters protection mode to redirect an optical signal which would have emerged from straight-through output 322f towards a component, a switching element 372f at row 350f could be switched to its active state to redirect the test signal 270 through the straight-through output 322f to emerge as a test signal 274f for testing the component. If more than one input signal is redirected to a protection output, the test signal can be used to test components one at a time by activating output test array switching elements one at a time to redirect the test signal 270 through the appropriate straight-through output. For example in FIG. 4, all of optical signals 250e through 250h have been redirected in protection mode. To test each component coupled to respective straight-through outputs 322e–322h, respective switching elements 372e–372h would be activated one by one to redirect the test signal 270 through straight-through outputs 322e –322h each in turn.

As can be seen from the figures, the number of optical signal inputs which can be redirected is equal to the number of protection outputs provided, which in this case is four. As was the case with the embodiment described in association with FIGS. 1 and 2, due to depopulation, each protection output is associated with a corresponding group of inputs it can be coupled to, the corresponding group of inputs being a subset of the total group of inputs. In the embodiment depicted in FIGS. 3 and 4, these sets are mutually exclusive, although in general this need not be the case. Protection output 330a is associated with a first group of inputs, namely 320a and every fourth input thereafter. Protection output 330b is associated with a first group of inputs, namely 320b and every fourth input thereafter. Protection output 330c is associated with a first group of inputs, namely 320c and every fourth input thereafter. Protection output 330d is associated with a first group of inputs, namely 320d and every fourth input thereafter. Since only one input at a time may be coupled to each protection output, only one input of the first group of inputs can be coupled to protection output 330a at any one time, only one input of the second group of inputs can be coupled to protection output 330b at any one time, only one input of the third group of inputs can be coupled to protection output 330c at any one time, and only one input of the fourth group of inputs can be coupled to protection output 330d at any one time.

It should be noted that the descriptions of the embodiments in association with FIGS. 1 through 4 are representative of protection switches while in use at the ingress side of the components for which protection is provided, for example a photonic switch fabric card. The same protection switch 100 (or 300) with the same switching array 110

(respectively 310) are used at the egress side of the component or line cards with complementary function.

Figure 5:
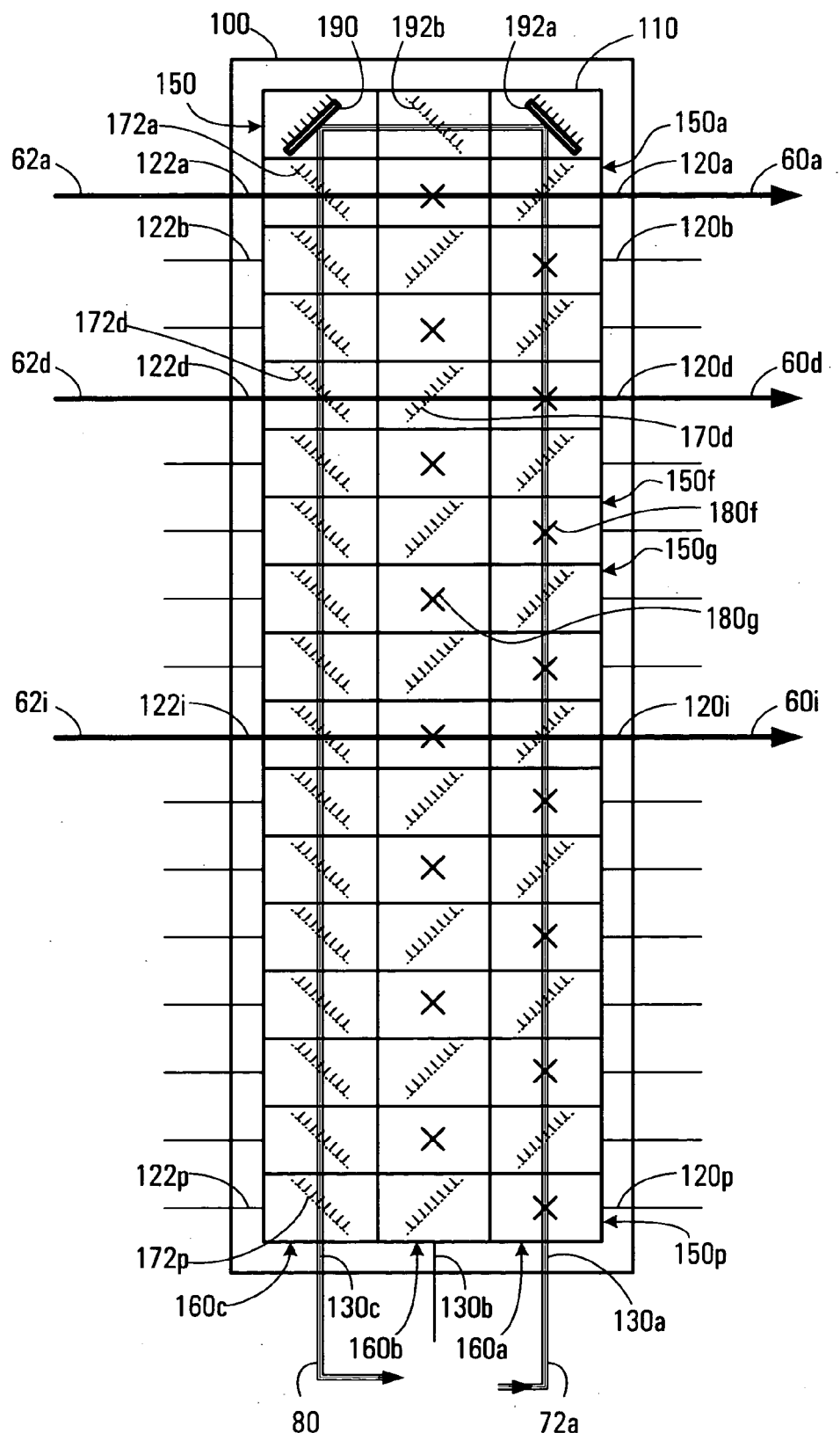
FIG. 5 is a schematic block diagram of the protection switch of FIG. 1 operating in service mode on the egress side of a switch card or other component.

FIG. 5 depicts the protection switch 100 used on the egress side of a switch card or other component. Although the protection switch depicted in FIG. 5 is a mirror image of that shown in FIGS. 1 and 2, it has the exact same relative arrangement of components and functions in exactly the same manner.

In this configuration however, the straight-through outputs 122a–122p are used as inputs, the inputs 120a–120p are used as outputs, the protection outputs 130a and 130b are used as protection inputs, and the test input 130c is used as a test output. For clarity, in association with FIGS. 5 and 6, the straight-through outputs 122a–122p are referred to as egress inputs 122a–122p, the inputs 120a–120p are referred to as egress straight-through outputs 120a–120p, the protection outputs 130a and 130b are referred to as egress protection inputs 130a and 130b, and the test input 130c is referred to as an egress test output 130c. The output test array, namely all sites in column 160c and rows 150a–150p, for clarity is referred to as an egress input test array in association with FIGS. 5 and 6.

As depicted in FIG. 5, in service mode, the protection switch 100 on the egress side of a switch card or component allows optical signals 62a–62p output from the switch card or component (not shown) to enter at egress inputs 122a–122p. These optical signals traverse the array 110 unaffected to emerge as output signals 60a–60p (three of which are shown 60a, 60d, and 60i) from respective egress straight-through outputs 120a–120p. The test signal 72a which has emerged from a redundant switch card or redundant component (not shown) enters an egress protection input 130a, traverses column 160a, impinges upon switching element 192a and is directed toward permanent switching element 190 from which it is directed downward along column 160c to be output from egress test output 130c as test output signal 80. As with a protection switch utilized on the ingress side of a switch card or other component, the switch test switching elements 192a and 192b are alternatively switched to alternate the column 160a or 160b over which the test signal traverses, in order to test whether all of the switching elements of the protection array are inactive. Not shown in this figure is a test receiver which is used to receive the test output signal 80 for monitoring of the various switches or components the test signal 70 from the test source (also not shown) has passed through.

It should be noted that it is desirable to coordinate the control of the switch test array of the protection switch 100 on the egress side of the switch card or other component, and the particular switching of the redundant switch card, with the control of the switch test array of the protection switch 100 on the ingress side of the switch card or other component. The test signal 72a may be input over egress protection input 130a or 130b depending upon the particular active switching configuration of both the protection switch 100 of the ingress trunk line card 3, and the redundant switch card 17. As such switching elements 192a and 192b of the protection switch 100 of the egress trunk line card 7 should be controlled to properly redirect the test signal traversing column 160a or 160b towards permanent switching element 190. It is also desirable that some coordination of control be used so that in the event of a failure of the protection path, an identification of where the failure has occurred, for example, in the ingress or egress protection switch, or in the redundant switch card or component, may be made through a process of elimination.

Figure 6:
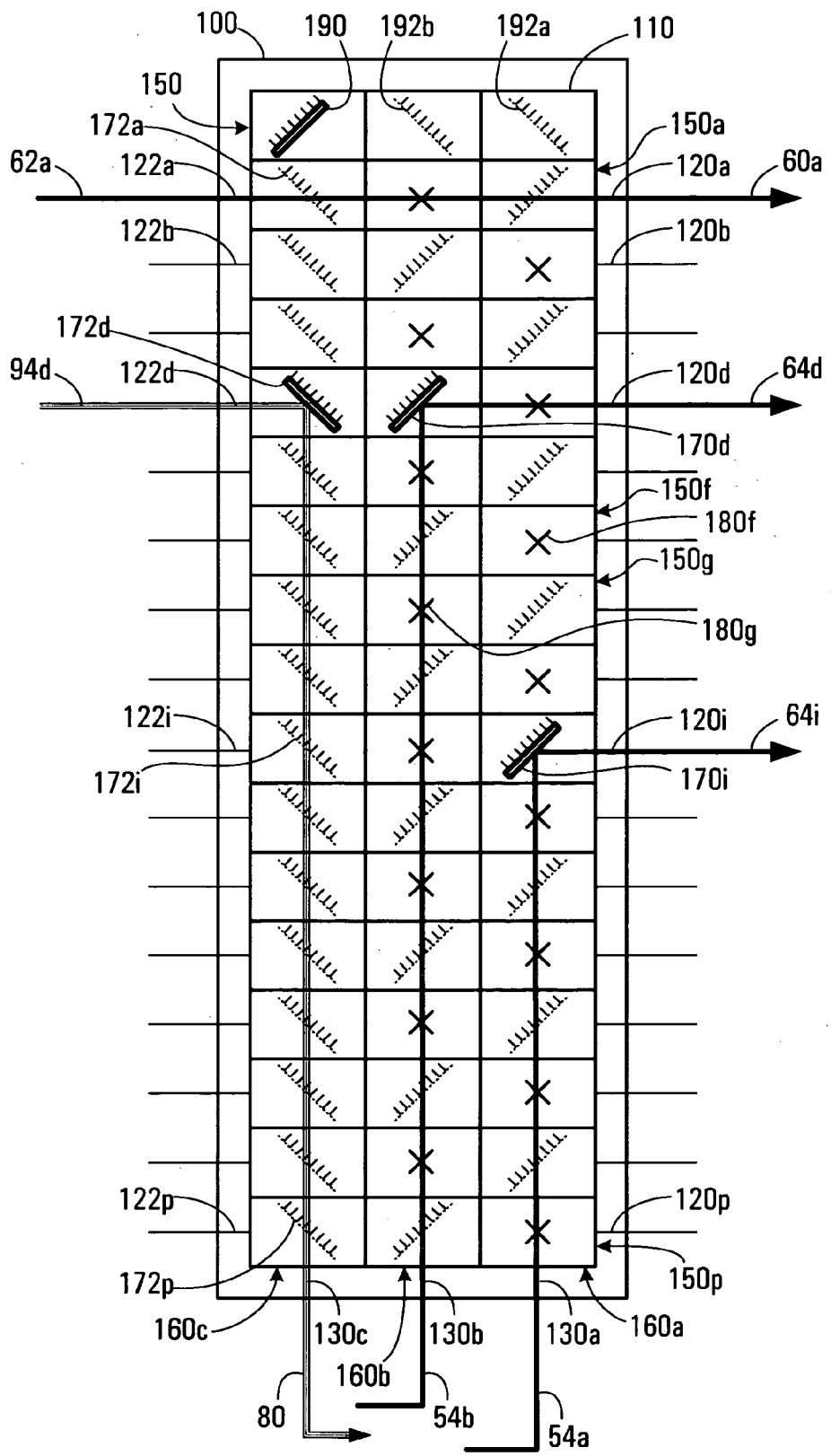
FIG. 6 is a schematic block diagram of the protection switch of FIG. 5 operating in protection mode.

FIG. 6 depicts the protection switch of FIG. 5 in protection mode. The protection switch 100 allows optical signal 62a output from a switch card or component (not shown) which has not failed to enter at egress input 122a. This optical signal traverses the array 110 unaffected to emerge as output signal 60a from respective egress straight-through output 120a. Optical signals 54a and 54b which have emerged from a redundant switch card or component (not shown) enter respective egress protection inputs 130a and 130b, traverse upwards along respective columns 160a and 160b, impinge upon respective active switch elements 170i and 170d, from which they are redirected along respective rows 150i an 150d to be output from respective egress straight-through outputs 120i an 120d as rerouted output signals 64i and 64d. It should be noted that the particular row from which a rerouted optical signal is output, in general does not need to have any relationship to the particular row of the ingress protection switch which redirected the optical signal. Depending upon the way in which the switch cards or other components are coupled to the outputs of the ingress protection switch and the inputs of the egress protection switch, the rows may or may not correspond to each other. In any case, the desired protection path may be controllably set according to the particular couplings between the protection switches, the switch cards, and the components farther down the optical path from them, so that any redirected optical signal proceeds towards its intended target path.

The test signal 94d if it emerges from the failed switch card or component (not shown) enters an egress input 122d, and is redirected by switching element 172d downwards along column 160c to emerge from egress test output 130c as test output signal 80. Not shown in this figure is a test receiver which is used to receive the test output signal 80 for monitoring the various switches or components the test signal 70 has passed through. It should be noted that when more than one optical signal is rerouted, it is desirable to coordinate the control of the egress input test array of the protection switch 100 on the egress side of the failed switch card or other failed component with the control of the output test array of the protection switch on the ingress side of the failed switch card or other component. As was described in association with FIG. 2, the test signal 70 is alternatively rerouted through each of the failed switch cards or components. As such, a test signal 94 emerging alternatively from different failed switch cards or components will arrive alternatively at the corresponding egress input of the egress protection switch. In FIG. 6, for example, from time to time, switching element 172i should be switched to its active state in order to redirect an optical signal 94i (not shown) when it is input to egress input 122i. Switching element 172d may be alternatively switched between an active and an inactive state in coordination with the signals emerging from the switch cards, or since switching element 172d is not in the path of a test signal redirected from switching element 172i, switching element 172d may be left in an active state while switching element 172i is alternated between an active and an inactive state, as required.

Figure 7:
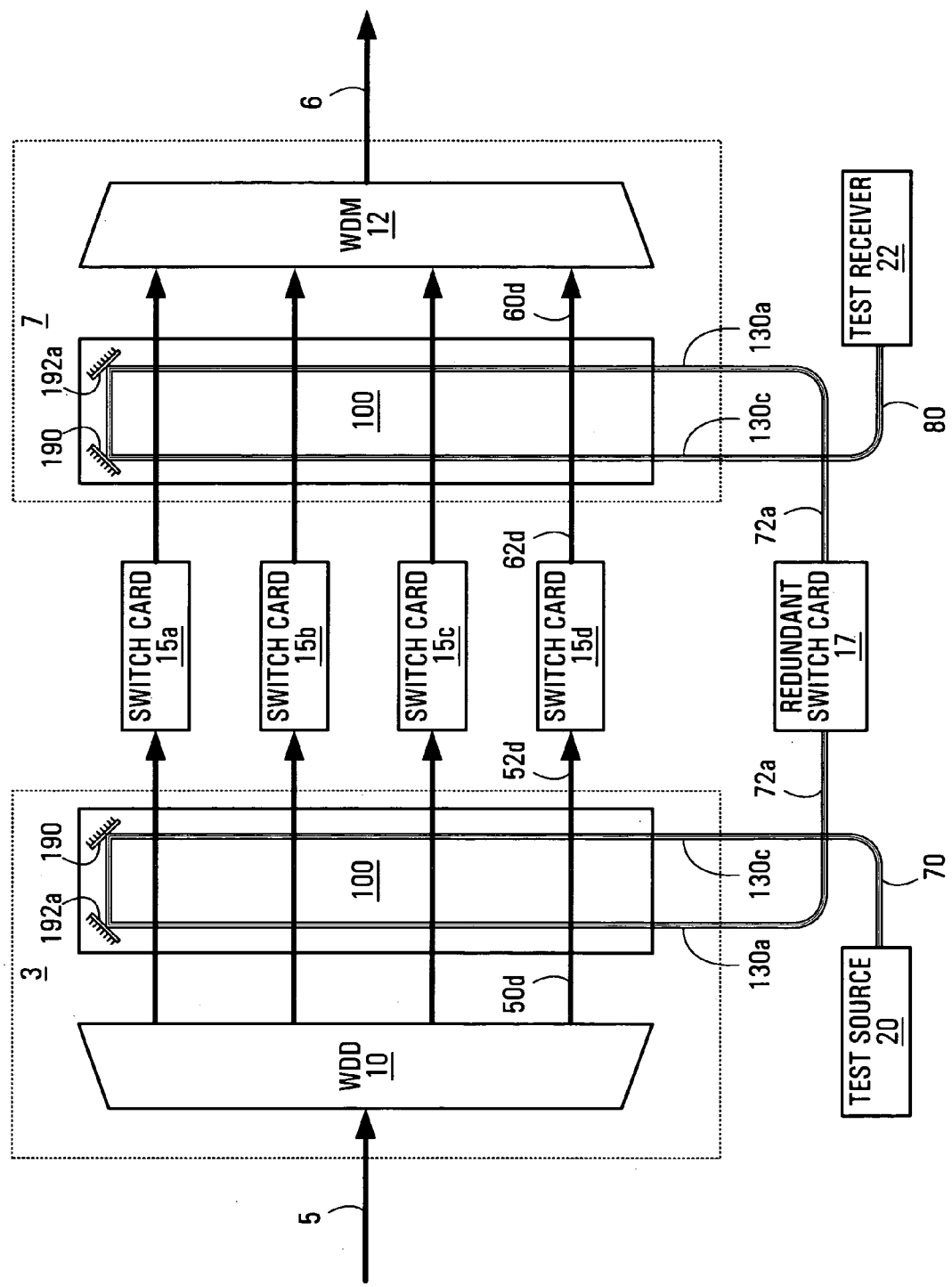
FIG. 7 is a schematic block diagram of a protection switching arrangement implementing the protection switch as depicted in FIGS. 1 and 5.
Figure 8:
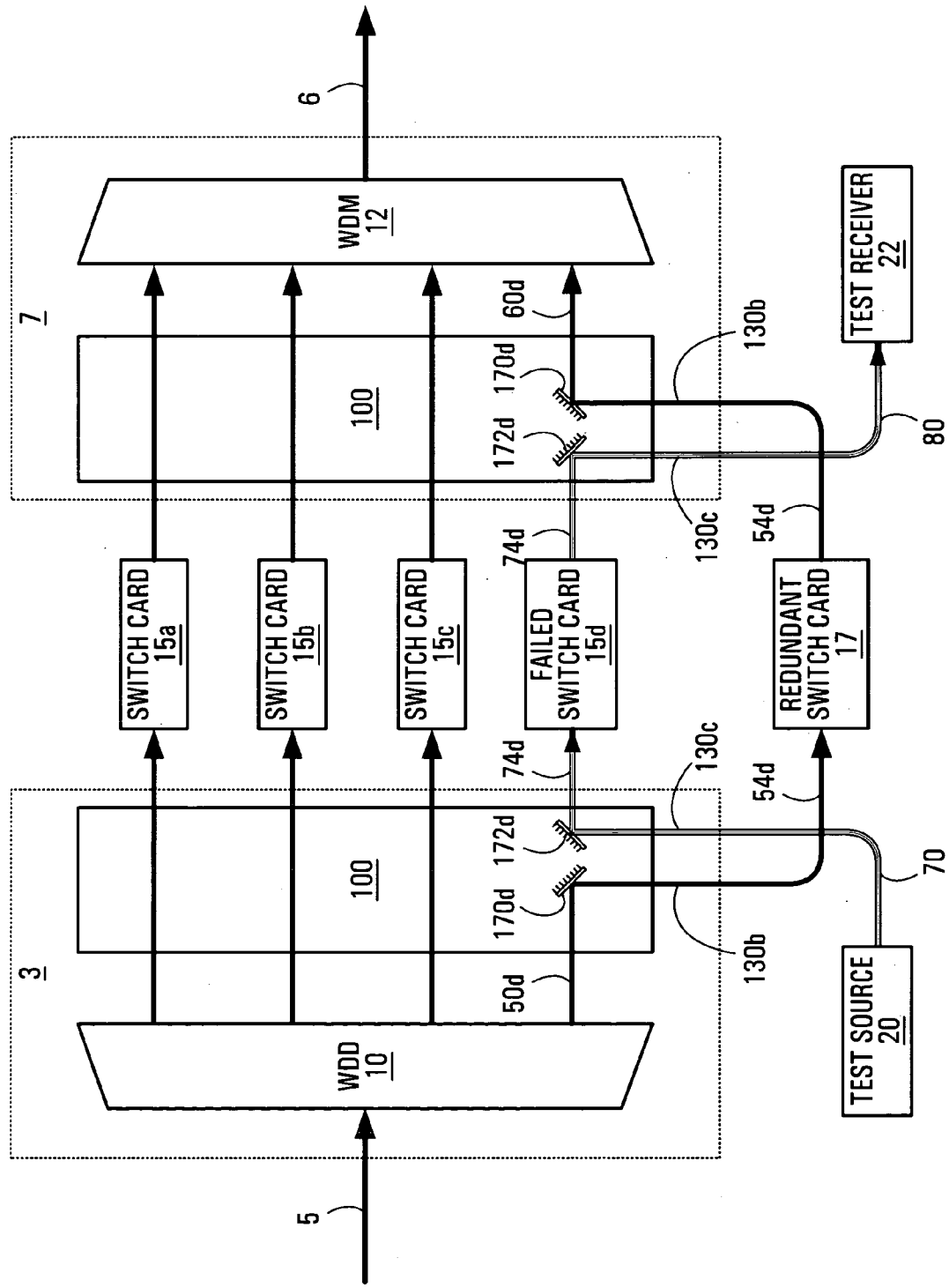
FIG. 8 is a schematic block diagram of a protection switching arrangement implementing the protection switch as depicted in FIGS. 2 and 6.

Referring now to FIGS. 7 and 8, a protection switching arrangement implementing the protection switches 100 of FIGS. 1, 2, 5, and 6 for a set of switch cards in a DWDM optical system is described. The arrangement includes an ingress trunk line card 3 having a wavelength division demultiplexer (WDD) 10, whose outputs are coupled to inputs of an ingress protection switch 100 as depicted in FIGS. 1 and 2. A test source 20 is coupled to test input 130c of the protection switch 100 of the ingress trunk line card 3.

The straight-through outputs of the protection switch 100 of the ingress trunk line card 3 are coupled to inputs of a set of switch fabric cards 15a–15d. Protection outputs, one of which is protection output 130a, of the protection switch 100 of the ingress trunk line card 3 are coupled to inputs of a redundant switch fabric card 17. Outputs of the switch fabric cards 15a–15d are coupled to egress inputs of a protection switch 100 of an egress trunk line card 7. Outputs of the redundant switch fabric card 17 are coupled to egress protection inputs of the protection switch 100 of the egress trunk line card 7. Straight-through outputs of the protection switch 100 of the egress trunk line card 7 are coupled to inputs of wavelength division multiplexer (WDM) 12. An egress test output 130c is coupled to an input of a test receiver 22. It should be understood that the particular depiction of the switch cards and their configuration with the trunk line cards is only representative of the actual configuration which is more fully described in co-pending U.S. application Ser. No. 09/726,027. For example, each switch card 15a–15d, and 17 is actually a switch plane, having a number of ingress trunk cards providing optical signal inputs to it. Each switch card 15a–15d, and 17 also has a number of egress trunk line cards connected to its outputs. As such each switch card would be capable of switching an optical signal from any one of a number of ingress trunk line card to any one of a number of egress trunk line cards. It should be understood that the ingress trunk line card 3, as shown in FIGS. 6 and 7, is representative of the ensemble of ingress trunk line cards, and that the egress trunk line card 7 representative of the ensemble of egress trunk line cards. The signals as shown in FIG. 7 represent the fact that for any optical signal output from an ingress trunk line card to a switch card, there will be an egress trunk line card for accepting the optical signal. FIGS. 7 and 8 should not be misunderstood as indicating that the same four signals emerging from a particular ingress trunk line card will necessarily be output to the same egress trunk line card.

In terms of function, the protection switching arrangement has a service mode of operation and a protection mode of operation corresponding to the mode of operation of the protection switches 100 with in the ingress trunk line card 3 and the egress trunk line card 7.

FIG. 7 depicts the protection switching arrangement operating in service mode. A multichannel optical signal 5 enters an input of the WDD 10 and is demultiplexed into a number of discrete optical signals. Each optical signal passes through the protection switch 100 of the ingress trunk line card 3 unaffected, and are input to inputs of the switch cards 15a–15d. The optical signals undergo the required switching in the switch fabric cards 15a–15d and are passed to their appropriate egress trunk line card 7. The switched optical signals pass through the protection switch 100 of the egress trunk line card 7 unaffected, and are input to WDM 12 where they are multiplexed and output as multichannel optical signal output 6. An example optical signal 50d passes through a protection switch 100 of an ingress trunk line card 3 unaffected as output signal 52d, and is input to its appropriate switch card 15d. Switch card 15d performs any switching required for the optical signal and outputs it as switched optical signal 62d. The switched signal 62d enters the appropriate egress trunk line card 7 and passes through its protection switch 100 unaffected, and emerges as output signal 60d. Output signal 60d enters WDM 12 where it is multiplexed into the multichannel optical signal 6.

While in service mode, the protection switch 100 of each ingress trunk line card 3, the protection switch 100 of each egress trunk line card 7, and the redundant switch card 17 are tested. Test source 20 outputs a test signal 70 which enters the protection switch 100 of the ingress trunk line card 3, at test input 130c. Test source 20 preferably is adapted to alternatively input the test signal 70 to the test input 130c of the protection switch 100 of each ingress trunk line card 3. The test signal traverses the protection switch 100 of the ingress trunk line card as was described in association with FIG. 1, being redirected by switching element 190 and for example switch element 192a to be output from protection output 130a. The test signal proceeds and is input as optical signal 72a to one of the inputs of redundant switch card 17 to test its functionality. Redundant switch card 17 switches the test signal 72a to one of its outputs in the process of testing its functionality. The test signal 72a output from the redundant switch card 17 is input to one of the egress trunk line cards 7 and enters an egress protection input 130a of its protection switch 100. The test signal traverses the protection switch 100 of the egress trunk line card 7 as was described in association with FIG. 5. The test signal is redirected by a switch test array switching element for example switching element 192a toward permanent switching element 190, from which it is directed out through the egress test output 130c as test output signal 80. The test output signal 80 proceeds to the test receiver 22 for monitoring the protection path. By controllably switching the test signal over the protection switch 100 of each ingress trunk line card 3, by testing all the possible protection paths through the redundant switch card 17, and by switching the test signal over the protection switch 100 of each egress trunk line card 7, all possible protection paths provided by the protection switching arrangement may be tested.

Referring now to FIG. 8, the protection arrangement in protection mode is described. In FIG. 8, one of the switch cards namely 15d has failed. The remaining switch cards 15a–15c have not failed. Optical signals passing therethrough are in general not affected by the failure of failed switch card 15d, and traverse the switching arrangement as described in association with FIG. 7 unaffected. Optical signal 50d which would have been serviced by failed switch card 15d is rerouted via switching element 170d in the protection switch 100 of the ingress trunk line card 3, through protection output 130b to an input of the redundant switch card 17. The redundant switch card 17 performs the switching to the appropriate egress trunk line card 7 which the failed switch card 15d would have performed were it not for its failure. The optical signal 50d is switched to the egress protection input 130b of the protection switch 100 of the egress trunk line card 7, to be rerouted via switch element 170d out the egress straight-through output 60d to the WDM 12 where it is multiplexed into multi-channel optical signal output 6.

When in protection mode, the test signal 70 from test source 20, enters the protection switch 100 of the ingress trunk line card 3 over test input 130c, to be redirected by switching element 172d as output 74d to test the failed switch fabric card 15d. The test signal 74d leaves the failed switch card 15d and enters the protection switch of the appropriate egress trunk line card 7 to be redirected by switching element 172d out of the egress test output 130c to a test receiver 22 for monitoring the failed switch card 15d.

Figure 9:
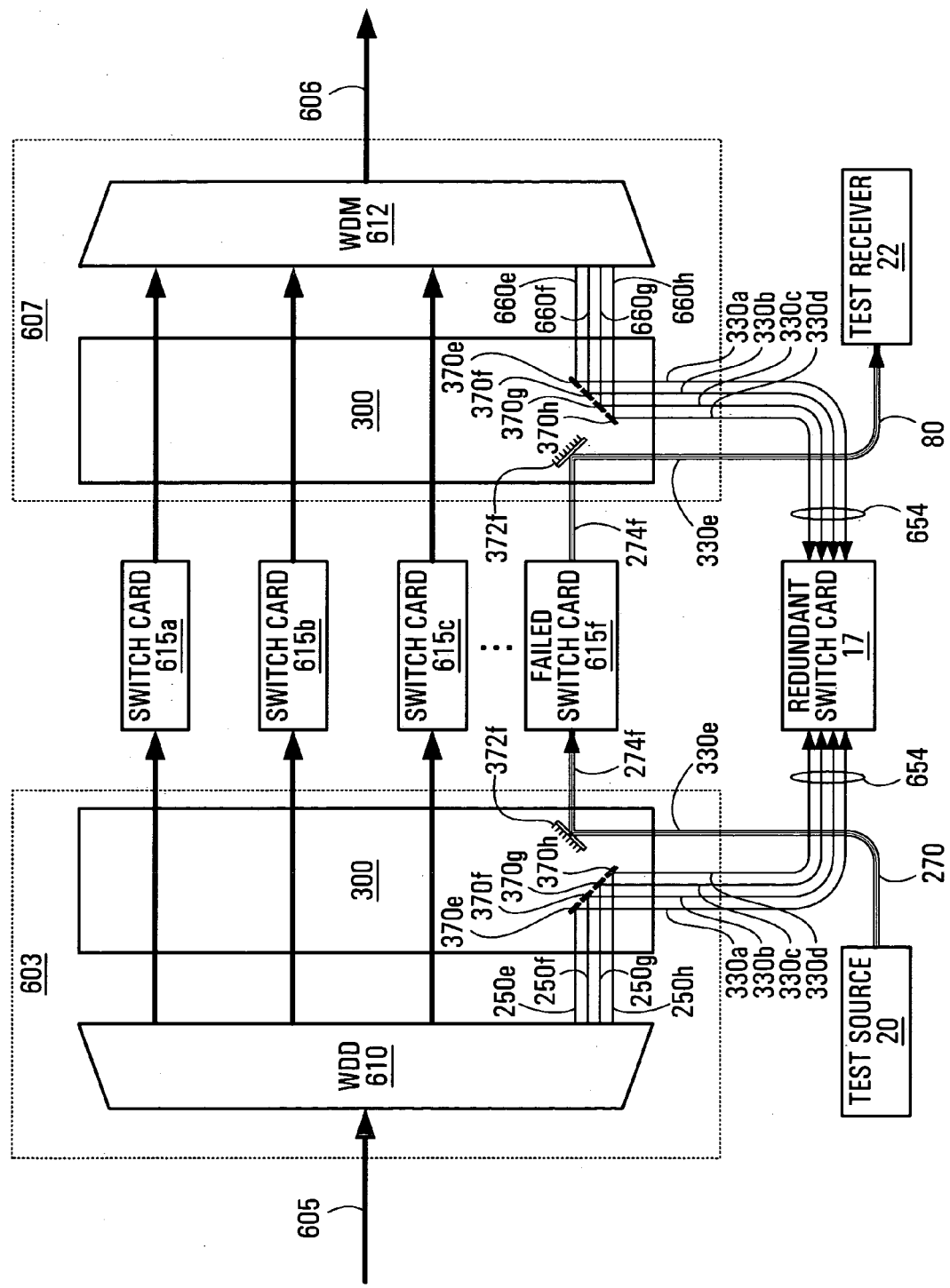
FIG. 9 is a schematic block diagram of an alternate protection switching arrangement implementing the protection switch as depicted in FIG. 4.

Referring now to FIG. 9, an alternate protection arrangement in protection mode is described. The alternate protection arrangement is similar to the arrangement of FIG. 8 but utilizes a protection switch 300 as depicted in FIG. 4. In FIG. 9, a switch card 615f has failed, while remaining switch cards 615a–615c have not failed. Optical signals passing therethrough are in general not affected by the failure of failed switch card 615*f*, and traverse the switching arrangement unaffected in an similar manner to that described in association with FIG. 7. Optical signals 250*e*–250*h* which would have been serviced by failed switch card 615*f* are rerouted via switching elements 370*e*–370*h* respectively in a protection switch 300 of an ingress trunk line card 603, through protection outputs 330*a*–330*d* to a set of inputs of the redundant switch card 17. The redundant switch card 17 performs the switching to the appropriate egress trunk line card 607 which the failed switch card 615*f* would have performed were it not for its failure. The optical signals 250*e*–250*h* are switched to egress protection inputs 330*a*–330*d* of a protection switch 300 of an egress trunk line card 607, to be rerouted via switch elements 370*e*–370*h* out egress straight-through outputs 660*e*–660*h* to the WDM 612 where it is multiplexed into multi-channel optical signal output 606.

When in protection mode, the test signal 270 from test source 20, enters the protection switch 300 of the ingress trunk line card 603 over test input 330*e*, to be redirected by switching element 372*f* as output 274*f* to test the failed switch fabric card 615*f*. The test signal 274*f* leaves the failed switch card 615*f* and enters the protection switch of the appropriate egress trunk line card 607 to be redirected by switching element 372*f* out of the egress test output 330*e* to a test receiver 22 for monitoring the failed switch card 615*f*.

It should be understood that although the specific embodiments of the protection switch are depicted as having a certain number of inputs, straight-through outputs, protection outputs and test inputs, a protection switch constructed in accordance with the invention may employ various other numbers of these outputs and inputs.

In each of the specific embodiments of the invention described hereinabove, the switch array may or may not be a single integrated array. In some embodiments of the invention the switch array is made up of separate arrays which have been securedly abutted.

It should be understood that although all of the foregoing embodiments of a protection switch have been implemented using a 2D MEMs array, the invention may equally be implemented using a 3D MEMs array, or other array based switching fabric. Depopulation of a protection array, and the use of an integrated switch test array as described in association with a specific 2D MEMs array may be applied to any switch fabric of 2 or 3 dimensions, or what will be referred to as a generalized switching fabric.

By having both unpopulated and populated protection array sites along some of the optical paths between inputs and respective straight-through outputs of a protection switch in a generalized switching fabric, an optical signal input over any input of the protection array is capable of being rerouted, while on the whole, the protection switch obtains the benefits of depopulation as described hereinbefore, including improving reliability, and the reduction of cost, complexity of manufacture, and possibly size.

It also should be noted that although in the embodiments depicted, each optical path between the input and the straight-through output has only one populated array site within the protection array, in general, any number of these sites may be populated, as long as some depopulation within the protection array is implemented. The amount and manner of depopulation will depend upon the relative importance within the particular application between the benefits of depopulation, and benefits of the redundancy and robustness of the protection provided. In the embodiment described in association with FIGS. 3 and 4, each optical input has only one possible protection output through which an optical signal may be rerouted. As such only one signal from each group of the four mutually exclusive groups of inputs may be protected. In the case where robust switching and redundancy are more important than depopulation, a switch array with population and depopulation inverse to that shown in FIGS. 3 and 4 may be utilized. In such a case the protection array would only be depopulated, in column 330*a* every fourth site starting with row 350*a*, in column 330*b* every fourth site starting with row 350*b*, in column 330*c* every fourth site starting with row 350*c*, and in column 330*d* every fourth site starting with row 350*d*. In this case, any group of four input signals may be protected, except only for groups of four input signals which are evenly spaced three rows apart (every fourth row). Only for this exception, would the protection switch only be able to reroute any three of the four input signals.

In a similar manner, depending upon the level of depopulation desired and the redundancy required, certain portions of the switch may be more depopulated than others. In some situations, some portions of the protection array may be fully populated. If for example it is required that any one of a preferred series of optical signals must always be protected when there is an available protection output, they could pass through portions of the protection array which has no depopulation and maximal redundancy to ensure that the preferred signal may be rerouted through any available protection output. In this situation, other optical signals could be input to portions of the protection array where there is depopulation. As an example, in FIGS. 3 and 4, rows 350*a* through 350*d* could be fully populated to ensure redundancy for preferred optical signals 250*a* through 250*d*. In this manner, even if any three of the protection outputs 330*a*–330*d* are used, any one of the preferred optical signals 250*a* may be rerouted over the free protection output. For this alternative embodiment, the overall cost, manufacturing complexity and size of the protection switch may still be reduced.

Notwithstanding the considerations outlined above, it should be understood that robustness and depopulation do not always conflict. This is the case in an extreme alternative embodiment in which the number of protection outputs equals the number of inputs. If depopulation is such that only one switching element is provided in each row in this case, every optical signal may be rerouted simultaneously as long as no two switching elements in the protection array occupy the same column. Such an embodiment would be robust and still obtain some of the benefits of depopulation (except perhaps a reduction in size). As with any embodiment, this particular one would have to satisfy conditions of practicality for use in any specific application.

By having a switch test array integrated within the switching array for redirecting test signals over each of the sites of the protection array, any generalized switching fabric may be tested for proper in service mode while benefiting from low insertion loss compared with external solutions to testing the protection array.

It also is to be understood that although specific controlling modules for the various switches, and arrays have not been depicted in the figures, that appropriate controlling mechanisms are provided to implement the switching as described hereinabove.

It should be understood that although the specific embodiments illustrated in the Figures comprise only a single switch test array, a single output test array, and a single protection array, more complicated arrangements in accordance with the teachings herein are possible. For example, if for some reason simultaneous testing with two test signals was desired, two adjacent output test arrays could be provided, along with two corresponding adjacent switch test arrays. Each switch test array would have a permanent switching element at the end of a column defined by the corresponding output test array, and a depopulated site at the end of the column defined by the output test array it does not correspond to. This structure is capable of providing simultaneous routing of two test signals both in the protection mode, over the in-service switch cards which may have failed, and in service mode over the columns of the protection array.

Numerous modifications and variations of the present invention are possible in light of the above teachings. It is therefore to be understood that within the scope of the appended claims, the invention may be practised otherwise than as specifically described herein.

We claim:

1. An optical protection switch comprising:
   a plurality of data inputs;
   for each data input a respective straight-through output, and a corresponding service optical path between the data input and its respective straight-through output;
   a plurality of protection outputs;
   for each protection output a respective protection optical path terminating at the protection output, each protection optical path intersecting each service optical path at a respective intersection location; and
   a protection array having a plurality of sites, each site located at an intersection location, the protection array adapted to operate in a protection mode and a service mode, the plurality of sites comprising:
   a plurality of populated sites, each populated site having a protection switching element for redirecting an input signal input at the respective data input towards the respective protection output when the protection array operates in protection mode, the protection switching element for allowing the input signal to traverse the populated site unaffected towards the respective straight-through output when the protection array operates in service mode, and
   a plurality of unpopulated sites, each unpopulated site for allowing an input signal input at the respective data input to pass through the unpopulated site unaffected towards the respective straight-through output.

2. An optical protection switch according to claim 1 wherein each protection switching element is adapted to perform said redirecting by switching to an active state, and wherein the protection switching element is adapted to allow the input signal to traverse the populated site having the switching element, unaffected, by switching to an inactive state.

3. An optical protection switch according to claim 1 further comprising:
   a test input; and
   a test array adapted to, when the protection array operates in service mode, redirect a test signal input at the test input to traverse the plurality of sites for testing that each protection switching element of each populated site is in an inactive state.

4. An optical protection switch according to claim 3 wherein the test array further comprises a switch test array, the switch test array comprising for each protection output a respective switch test site originating the respective protection optical path, each switch test site having a switch test switching element for redirecting the test signal along the respective protection optical path.

5. An optical protection switch according to claim 4 wherein each switch test switching element performs said redirecting of the test signal when the protection array operates in the service mode by switching to an active state.

6. An optical protection switch according to claim 5 wherein the test array further comprises an output test array, the output test array comprising:
   for each data input an output test site on the respective service optical path at a location between the protection array and the respective straight-through output, the output test site having an output test switching element adapted to, when the protection array operates in protection mode, redirect the test signal to the respective straight-through output, and adapted to, when the protection array operates in service mode, allow the input signal and the test signal to traverse the output test site unaffected.

7. An optical protection switch according to claim 6 wherein each output test switching element performs said redirecting of the test signal when the protection array operates in protection mode by switching to an active state, and wherein the output test switching element performs said allowing the input signal and the test signal to traverse the output test site unaffected when the protection array operates in service mode by switching to an inactive state.

8. An optical protection switch according to claim 7 wherein the switch test array further comprises a permanent switch site having a permanent switching element permanently in an active state, the permanent switching element adapted to, when the protection array operates in service mode, redirect the test signal input at the test input toward each switch test site.

9. An optical protection switch according to claim 8 wherein each output test site is located on an optical path between the permanent switch site and the test input.

10. An optical protection switch according to claim 9 wherein the test array, and the protection array are MEMs optical switch arrays, and wherein each protection switching element, the switch test switching element, the permanent switching element, and each output test switching element are MEMs micro-mirrors.

11. An optical protection switch according to claim 3 wherein the test array and the protection array together comprise a switch array.

12. An optical protection switch according to claim 3 wherein the test array and the protection array are portions of a single integrated switch array.

13. An optical protection switch comprising:
   a plurality of data inputs;
   for each data input a respective straight-through output;
   a plurality of protection outputs; and
   a depopulated protection array adapted to operate in a protection mode for switching an input signal input at any one data input of the plurality of data inputs to one protection output of the plurality of protection outputs, the protection array adapted to operate in a service mode for allowing the input signal to be output at the respective straight-through output unaffected.

14. An optical protection switch according to claim 13 wherein the protection array comprises switching elements for performing said switching of the input signal input.

15. An optical protection switch according to claim 14 wherein the protection array operating in the service mode presents for each data input an unimpeded optical pathway between the data input and the respective straight-through output.

16. An optical protection switch according to claim 15 further comprising:
   a test input; and
   a test array adapted to, when the protection array operates in the service mode, redirect a test signal input at the test input for testing that each protection switching element is in an inactive state.

17. An optical protection switch according to claim 16 wherein the test array further comprises a switch test array, the switch test array comprising a plurality of switch test sites, each switch test site having a switch test switching element adapted to perform said redirecting of the test signal.

18. An optical protection switch according to claim 17 wherein the test array further comprises an output test array, the output test array comprising:
   for each data input, an output test site on the optical path between the data input and the respective straight-through output for, when the protection array operates in the protection mode, redirecting the test signal to the respective straight-through output, and adapted to, when the protection array operates in the service mode, allow an input signal input at the data input and the test signal to traverse the output test site unaffected.

19. An optical protection switch according to claim 18 wherein the switch test array further comprises a permanent switch site having a permanent switching element permanently in an active state, the permanent switching element adapted to, when the protection array operates in the service mode, redirect the test signal input at the test input toward each switch test site.

20. An optical protection switch comprising:
   a switching fabric comprising a plurality of sites arranged in intersecting rows and columns, the switching fabric adapted to operate in a protection mode and a service mode;
   a plurality of data inputs, each data input located at a first end of a respective row of the switching fabric;
   for each data input a respective straight-through output located at a second end of the respective row; and
   a plurality of protection outputs, each protection output located at a first end of the respective column of the switching fabric;
wherein the plurality of sites of the switching fabric comprise:
   a plurality of populated sites, each populated site located at an intersection of a respective row of a data input and a respective column of a protection output, the populated site having a protection switching element for redirecting an input signal input at the data input towards the protection output when the switching fabric operates in protection mode, the protection switching element for allowing the input signal to traverse the populated site unaffected towards the respective straight-through output when the switching fabric operates in service mode, and
   a plurality of unpopulated sites, each unpopulated site located at an intersection of a respective row of a data input and a respective column of a protection output, the unpopulated site for allowing an input signal input at the data input to pass through the unpopulated site unaffected towards the respective straight-through output.

21. An optical protection switch according to claim 20 wherein each protection switching element is adapted to perform said redirecting by switching to an active state, and wherein the protection switching element is adapted to allow the input signal to traverse the populated site having the switching element, unaffected, by switching to an inactive state.

22. An optical protection switch according to claim 20 further comprising:
   a test input located at a first end of a test column of the switching fabric;
wherein the plurality of sites of the switching fabric comprise a plurality of test sites, wherein the test sites are arranged to, when the switching fabric operates in service mode, redirect a test signal input at the test input to traverse the plurality of populated sites for testing that each protection switching element of each populated site is in an inactive state.

23. An optical protection switch according to claim 22 wherein the plurality of test sites comprise a plurality of output test sites, each output test site being located on the test column on a respective row of a data input, the test column located nearest the second ends of the rows of the switching fabric, each output test site having an output test switching element adapted to, when the switching fabric operates in protection mode, redirect the test signal to the respective straight-through output, and adapted to, when the switching fabric operates in service mode, allow the input signal and the test signal to traverse the output test site unaffected.

24. An optical protection switch according to claim 23 wherein each output test switching element performs said redirecting of the test signal when the switching fabric operates in protection mode by switching to an active state, and wherein the output test switching element performs said allowing the input signal and the test signal to traverse the output test site unaffected when the switching fabric operates in service mode by switching to an inactive state.

25. An optical protection switch according to claim 24 wherein the plurality of test sites further comprise a plurality of switch test sites, each switch test site being located nearest the second end of the respective column of a protection output, each switch test site having a switch test switching element for redirecting the test signal along the respective column toward the protection output.

26. An optical protection switch according to claim 25 wherein each switch test switching element performs said redirecting of the test signal when the switching fabric operates in the service mode by switching to an active state.

27. An optical protection switch according to claim 26 wherein the plurality of switch test sites further comprise a permanent switch site having a permanent switching element permanently in an active state, the permanent switching element located on the test column at a row nearest the second end of the test column, the permanent switching element adapted to, when the switching fabric operates in service mode, redirect the test signal input at the test input toward each switch test site.

28. An optical protection switch according to claim 22 wherein the plurality of test sites, and the plurality of protection sites are sites of MEMs optical switch arrays, and wherein each protection switching element, each switch test switching element, the permanent switching element, and each output test switching element is a MEMs micro-mirror.

29. An optical protection switch according to claim 22 wherein the plurality of sites of the switching fabric together comprise a single integrated switch array.

* * * * *